United States Patent
Man et al.

(10) Patent No.: US 9,263,795 B2
(45) Date of Patent: Feb. 16, 2016

(54) MOBILE WIRELESS COMMUNICATIONS DEVICE HAVING DUAL ANTENNA SYSTEM FOR CELLULAR AND WIFI

(71) Applicant: BLACKBERRY LIMITED, Waterloo (CA)

(72) Inventors: Ying Tong Man, Waterloo (CA); Yihong Qi, Waterloo (CA)

(73) Assignee: BLACKBERRY LIMITED, Ontario (CA)

(*) Notice: Subject to any disclaimer, the term of this patent is extended or adjusted under 35 U.S.C. 154(b) by 0 days.

(21) Appl. No.: 14/471,521

(22) Filed: Aug. 28, 2014

(65) Prior Publication Data

US 2014/0368390 A1    Dec. 18, 2014

Related U.S. Application Data

(63) Continuation of application No. 14/034,592, filed on Sep. 24, 2013, now Pat. No. 8,847,829, which is a continuation of application No. 13/103,144, filed on May 9, 2011, now Pat. No. 8,564,487, which is a continuation of application No. 12/392,321, filed on Feb. 25, 2009, now Pat. No. 7,940,222, which is a continuation of application No. 12/100,613, filed on Apr. 10, 2008, now Pat. No. 7,511,673, which is a continuation of application No. 11/468,803, filed on Aug. 31, 2006, now Pat. No. 7,369,091.

(51) Int. Cl.

| | |
|---|---|
| *H01Q 1/52* | (2006.01) |
| *H01Q 1/22* | (2006.01) |
| *H01Q 1/24* | (2006.01) |
| *H01Q 21/28* | (2006.01) |
| *H01Q 21/00* | (2006.01) |
| *H01Q 9/04* | (2006.01) |
| *H01Q 25/00* | (2006.01) |
| *H04M 1/02* | (2006.01) |

(52) U.S. Cl.
CPC ............. *H01Q 1/523* (2013.01); *H01Q 1/2291* (2013.01); *H01Q 1/243* (2013.01); *H01Q 1/521* (2013.01); *H01Q 9/045* (2013.01); *H01Q 21/0087* (2013.01); *H01Q 21/28* (2013.01); *H01Q 25/00* (2013.01); *H04M 1/026* (2013.01); *Y10T 29/49016* (2015.01); *Y10T 29/49018* (2015.01)

(58) Field of Classification Search
CPC ....... H01Q 1/243; H01Q 1/523; H01Q 9/045; H01Q 25/00
USPC .......................................... 343/702
See application file for complete search history.

(56) References Cited

U.S. PATENT DOCUMENTS

| | | |
|---|---|---|
| 6,448,933 B1 | 9/2002 | Hill et al. |
| 6,670,923 B1 | 12/2003 | Kadambi et al. |

(Continued)

FOREIGN PATENT DOCUMENTS

| | | |
|---|---|---|
| CN | 1511359 | 7/2004 |
| EP | 1291968 | 3/2003 |

(Continued)

*Primary Examiner* — Hoang V Nguyen
(74) *Attorney, Agent, or Firm* — Guntin & Gust, PLC; Andrew Gust

(57) ABSTRACT

A mobile wireless communications device includes a housing and circuit board carried by the housing. Radio Frequency (RF) circuitry is mounted on the circuit board. A first antenna is supported by the circuit board within the housing and operatively connected to the RF circuitry and configured for cellular phone communications. A second antenna is supported by the circuit board within the housing and operatively connected to the RF circuitry and configured for WiFi communications. The second antenna comprises an inverted-F or monopole antenna having an opening gap that is pointed away from the first antenna.

28 Claims, 5 Drawing Sheets

(56) References Cited

U.S. PATENT DOCUMENTS

| | | |
|---|---|---|
| 6,885,880 B1 | 4/2005 | Ali |
| 6,922,172 B2 | 7/2005 | Oshiyama et al. |
| 6,930,641 B2 | 8/2005 | Ohara et al. |
| 6,980,154 B2 | 12/2005 | Vance et al. |
| 7,015,863 B2 | 3/2006 | Sadler et al. |
| 7,043,285 B2 | 5/2006 | Boyle |
| 7,053,844 B2 | 5/2006 | Gaucher et al. |
| 7,088,293 B2 | 8/2006 | Imaizumi et al. |
| 7,187,338 B2 | 3/2007 | Boyle et al. |
| 7,265,722 B2 | 9/2007 | Liu et al. |
| 7,383,067 B2 | 6/2008 | Phillips et al. |
| 7,417,591 B2 | 8/2008 | Iguchi et al. |
| 7,760,146 B2 * | 7/2010 | Ollikainen ............ 343/702 |
| 2005/0041624 A1 | 2/2005 | Hui et al. |
| 2005/0225484 A1 | 10/2005 | Kuramoto |
| 2006/0214857 A1 | 9/2006 | Ollikainen |
| 2010/0195854 A1 | 8/2010 | Qi et al. |
| 2011/0210894 A1 | 9/2011 | Man et al. |

FOREIGN PATENT DOCUMENTS

| | | |
|---|---|---|
| EP | 1503450 | 2/2005 |
| EP | 1440492 | 1/2006 |
| WO | 0205381 | 1/2002 |
| WO | 03017425 | 2/2003 |
| WO | 2005067635 | 7/2005 |

* cited by examiner

MOBILE WIRELESS COMMUNICATIONS DEVICE HAVING DUAL ANTENNA SYSTEM FOR CELLULAR AND WIFI

FIELD OF THE INVENTION

The present invention relates to the field of communications devices, and more particularly, to communications devices that use dual antenna systems.

BACKGROUND OF THE INVENTION

Cellular communication systems continue to grow in popularity and have become an integral part of both personal and business communications. Cellular telephones and similar devices allow users to place and receive phone calls most anywhere they travel. Moreover, as cellular telephone technology is increased, so too has the functionality of cellular devices. For example, many cellular devices now incorporate Personal Digital Assistant (PDA) features such as calendars, address books, task lists, calculators, memo and writing programs, etc. These multi-function devices usually allow users to send and receive electronic mail (email) messages wirelessly and access the Internet via a cellular network and/or a wireless local area network (WLAN), for example, when the devices include appropriate circuitry for WiFi and other IEEE 802.11 WLAN access.

Many of the cellular communications use packet burst transmissions as part of a Global System for Mobile communications (GSM) system, which includes the 850 MHz, 900 MHz, 1800 MHz and 1900 MHz frequency bands. Although these mobile wireless communication devices function as a cellular telephone, as noted before, the device can also operate and incorporate Personal Digital Assistant (PDA) features and send and receive email and other messages wirelessly and across the internet via the cellular network and/or a wireless Local Area Network (LAN). This function can include access to "hot spots" as part of a WiFi network using IEEE 802.11 standards.

When such devices incorporate WiFi technology, the circuits could be considered to describe WLAN products based on IEEE 802.11 standards, using one or more Access Points (APs) as "hot spots" and various numbers of clients. An AP typically broadcasts a Service Set Identifier, "network name" (SSID), using packets called "beacons" by some skilled in the art, which are broadcast every one hundred or so milliseconds at about one Mbit\s duration in some non-limiting examples. Some of these WiFi devices operate in the 2.4 or 5.0 GHz band.

A wireless access point usually connects wireless stations to an adjacent, wired local area network, and is operative similar to an Ethernet hub. The access point can relay wireless data to other compatible wireless devices and to a single, connected local area network device, such as a Ethernet hub or switch. Wireless routers are often used to integrate a wireless access point with a Ethernet switch and Ethernet router.

In a mobile wireless communications device, if the cellular capability is integrated with WiFi capability, often two different antennas are used, for example, a main cellular antenna operative at GSM or other CDMA band and a WiFi antenna operative in the at least 2.4 GHz band, and sometimes the 5.0 GHz band, making the device not only compatible with cellular GSM communications, but also compatible with WiFi communications using IEEE 802.11 standards. The antenna designs become more challenging, however, as the size and thickness of the mobile phones become smaller to meet marketing requirements and the desires of end-use consumers. In order to implement multiple antennas in a compact environment, the antennas should be designed to reduce the coupling between the various antennas. This is necessary not only to enhance radio performance, but also reduce the cost of implementing Electromagnetic Interference (EMI) filters at harmonic frequencies. Thus, the type of antenna designs used in such devices become important to reduce the mutual coupling due to the third harmonics between a GSM or similar cellular antenna, operative, for example, at 850 MHz, and a WiFi antenna operative at 2.4 GHz. Isolating these antennas can be difficult, and different feeding techniques should be introduced to enhance isolation between the two antennas. The two systems, cellular as a Wide Area Network (WAN) and WiFi need to work simultaneously, and thus, isolation between antennas is very critical.

BRIEF DESCRIPTION OF THE DRAWINGS

Other objects, features and advantages will become apparent from the detailed description which follows when considered in light of the accompanying drawings in which.

DETAILED DESCRIPTION OF THE PREFERRED EMBODIMENTS

Figure 1:
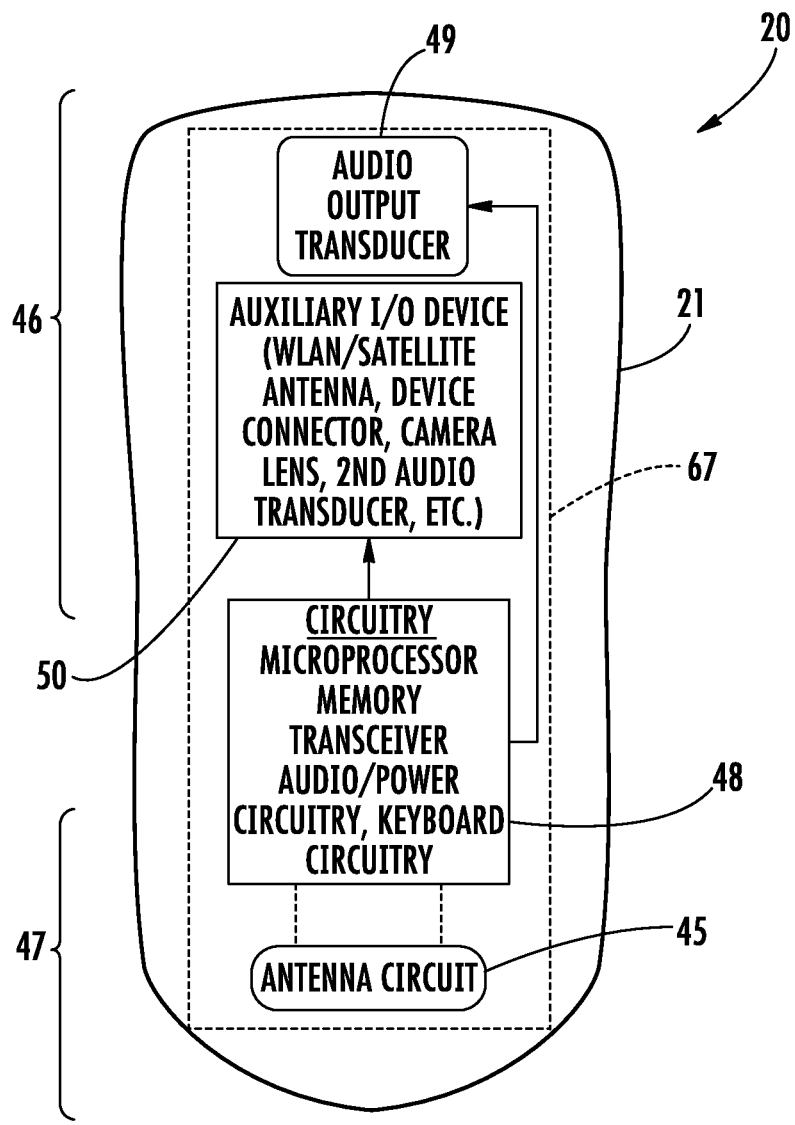
FIG. 1 is a schematic block diagram of an example of a mobile wireless communications device configured as a handheld device that can be used in accordance with non-limiting examples and illustrating basic internal components thereof.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

A mobile wireless communications device includes a housing and circuit board carried by the housing. Radio Frequency (RF) circuitry is mounted on the circuit board. A first antenna is supported by the circuit board within the housing and operatively connected to the RF circuitry and configured for cellular phone communications. A second antenna is supported by the circuit board within the housing and operatively connected to the RF circuitry and configured for WiFi communications. The second antenna comprises an inverted-F or monopole antenna having an opening gap that is pointed away from the first antenna.

In yet another aspect, the first antenna is operative at frequencies in the Global System for Mobile (GSM) communications band (or CDMA). The second antenna is operative at the 2.4 GHz and 5.0 GHz band in accordance with 802.11 standards. The second antenna can include a feeding point positioned distal from the opening gap at an opposing end from the opening gap. The housing can include an upper and lower portion. In one aspect the first antenna is positioned at a lower portion of the housing and the second antenna is mounted on the circuit board at an upper portion of the housing. The opening gap is positioned upward toward the upper portion of the housing in one non-limiting example.

In yet another aspect, the circuit board can be formed as a ground plane for the first and second antennas. The second antenna is substantially rectangular configured in plan view in one non-limiting example and includes an upper edge that forms the opening gap of the inverted-F or monopole antenna. A lower edge forms a lower leg of the antenna. This lower edge or leg could include a feeding point and grounding point at opposite corners thereof, which could be reversed from each other. In another non-limiting example, the second antenna can be configured at a quarter or half lamda in length.

In accordance with one non-limiting example, the WiFi antenna is operative in the 2.4 GHz frequency bands in this non-limiting example, and is bottom-fed relative to the cellular antenna, which is also positioned in the housing. This relative positioning reduces mutual coupling to the cellular, e.g., GSM 850 MHz antenna at its third harmonic frequency. For purposes of clarity and description, the term WiFi antenna can refer to any number of antennae that are operative in these frequency bands in accordance with IEEE 802.11 and similar standards. Also included under this term WiFi antenna could be different Bluetooth applications.

The WiFi antenna could be a quarter or half lamda long and preferably is formed as an inverted-F or monopole type antenna. The opening gap in the inverted-F or monopole type antenna faces away from the cellular, e.g., GSM antenna (or CDMA) positioned preferably at the lower portion of the device housing. The inverted-F or monopole type WiFi antenna is positioned on the main Printed Circuit Board (PCB) of the wireless device, such as at an upper portion. This PCB also serves as a ground plane for the antennas. The WiFi antenna includes a feeding point and a grounding point, positioned preferably at the lower portion of the inverted-F or monopole type antenna, opposite the opening gap. These two positions for the grounding point and feeding point could be interchangeable. It should also be understood that the inverted-F or monopole antenna could be used for other non-WiFi applications, such as GPS.

Figure 2:
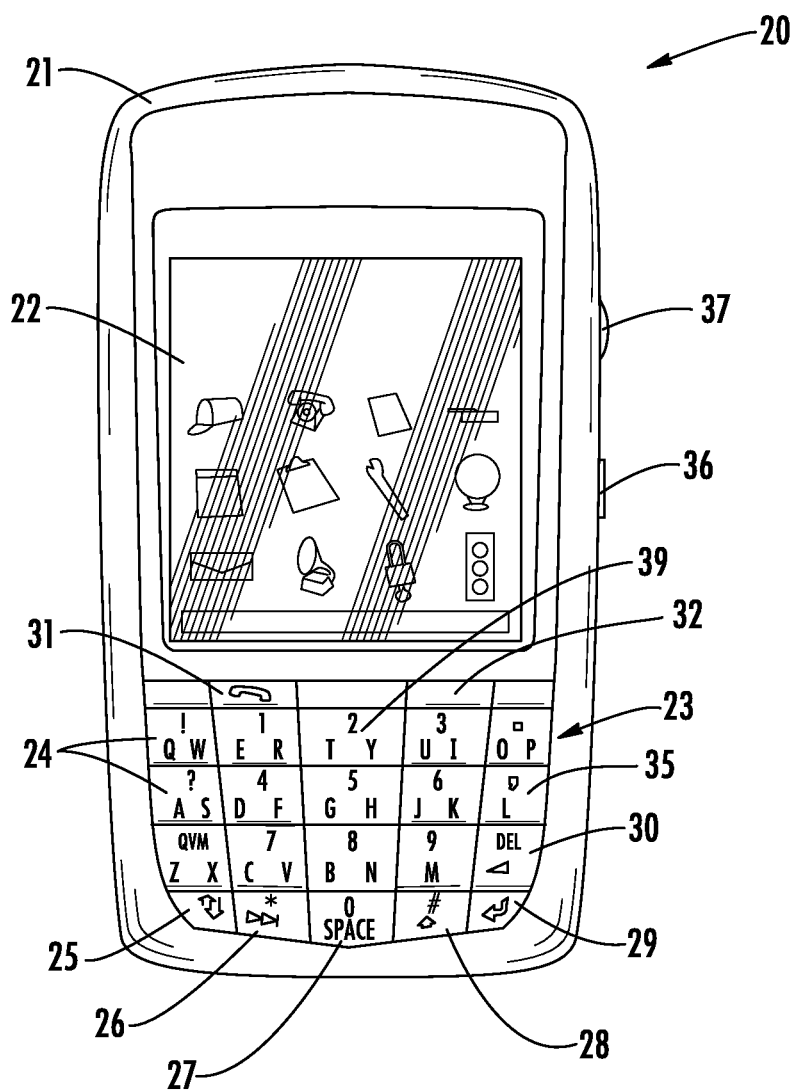
FIG. 2 is a front elevation view of the mobile wireless communications device of FIG. 1.
Figure 3:
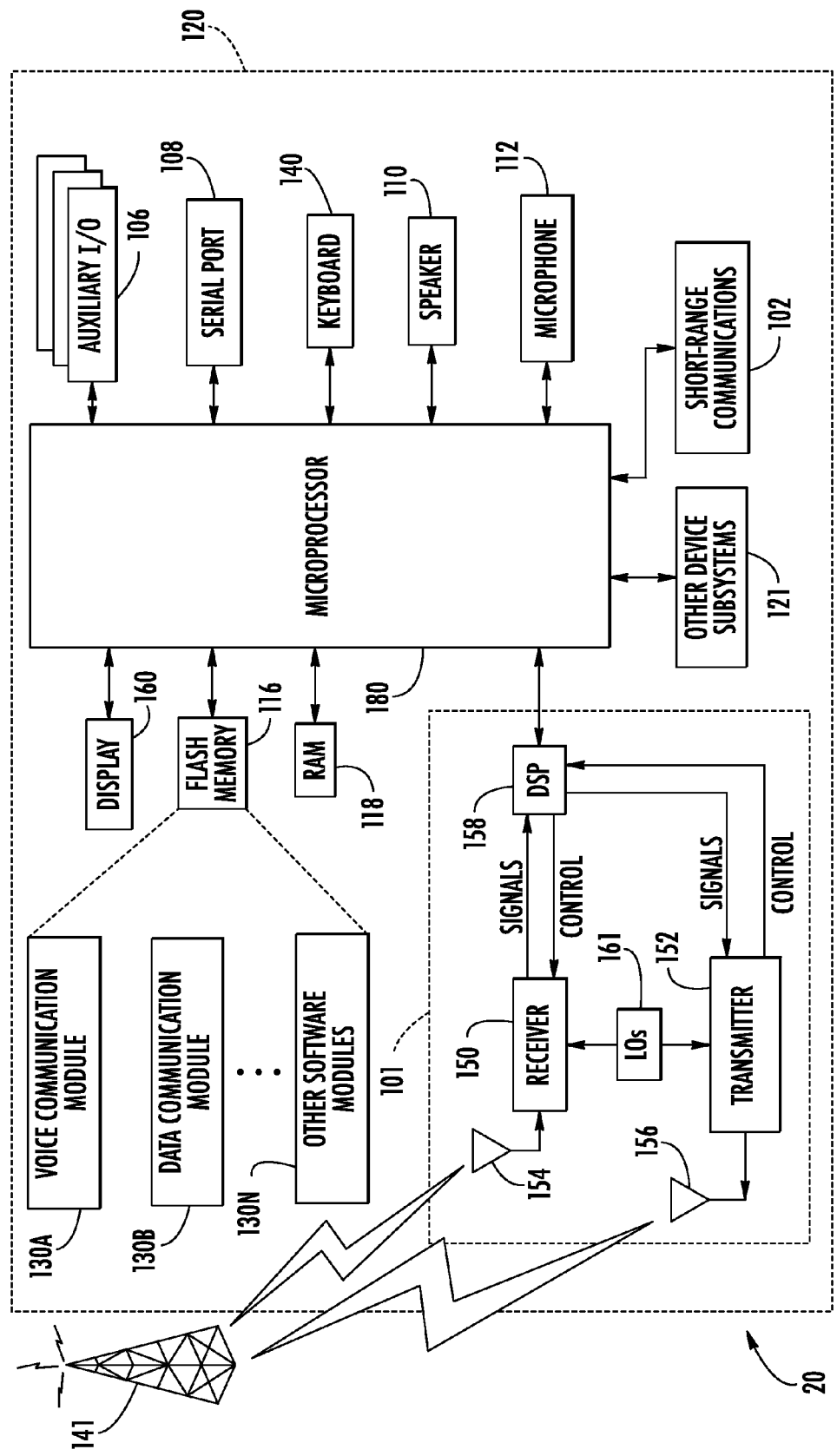
FIG. 3 is a schematic block diagram showing basic functional circuit components that can be used in the mobile wireless communications device of FIGS. 1-2.

A brief description will now proceed relative to FIGS. 1-3, which disclose an example of a mobile wireless communications device, for example, a handheld portable cellular radio, which can incorporate non-limiting examples of various circuits that can be used with the cellular antenna and WiFi antenna. FIGS. 1-3 are representative non-limiting examples of the many different types of functional circuit components and their interconnection, and operative for use with the antenna as later described below.

Referring initially to FIGS. 1 and 2, an example of a mobile wireless communications device 20, such as a handheld portable cellular radio is first described. This device 20 illustratively includes a housing 21 having an upper portion 46 and a lower portion 47, and a dielectric substrate (i.e., circuit board) 67, such as a conventional printed circuit board (PCB) substrate, for example, carried by the housing. A housing cover (not shown in detail) would typically cover the front portion of the housing. The term circuit board 67 as used hereinafter can refer to any dielectric substrate, PCB, ceramic substrate or other circuit carrying structure for carrying signal circuits and electronic components within the mobile wireless communications device 20. The illustrated housing 21 is a static housing, for example, as opposed to a flip or sliding housing, which is used in many cellular telephones. However, these and other housing configurations may also be used.

Circuitry 48 is carried by the circuit board 67, such as a microprocessor, memory, one or more wireless transceivers (e.g., cellular, WLAN, etc.), which includes RF circuitry, including audio and power circuitry, including any keyboard circuitry. It should be understood that keyboard circuitry could be on a separate keyboard, etc., as will be appreciated by those skilled in the art. A battery (not shown) is also preferably carried by the housing 21 for supplying power to the circuitry 48. The term RF circuitry could encompass the interoperable RF transceiver circuitry, power circuitry and audio circuitry.

Furthermore, an audio output transducer 49 (e.g., a speaker) is carried by an upper portion 46 of the housing 21 and connected to the circuitry 48. One or more user input interface devices, such as a keypad (keyboard) 23 (FIG. 2), is also preferably carried by the housing 21 and connected to the circuitry 48. The term keypad as used herein also refers to the term keyboard, indicating the user input devices having lettered and/or numbered keys commonly known and other embodiments, including multi-top or predictive entry modes. Other examples of user input interface devices include a scroll wheel 37 and a back button 36. Of course, it will be appreciated that other user input interface devices (e.g., a stylus or touch screen interface) may be used in other embodiments.

A cellular antenna 45, for example, a GSM antenna, is preferably positioned at the lower portion 47 in the housing and can be formed as a pattern of conductive traces that make an antenna circuit, which physically forms the antenna. This cellular antenna is connected to the circuitry 48 on the main circuit board 67. In one non-limiting example, the cellular antenna could be formed on an antenna circuit board section that extends from the main circuit board at the lower portion of the housing. An example of a cellular antenna that could be used or modified for use is disclosed in commonly assigned U.S. Patent Publication No. 2006/0172785, the disclosure which is hereby incorporated by reference in its entirety. By placing the cellular antenna 45 adjacent the lower portion 47 of the housing 21, the distance is advantageously increased between the cellular antenna and the user's head when the phone is in use to aid in complying with applicable SAP requirements. Also, a separate keyboard circuit board could be used. The WiFi antenna (not shown in this figure) can be located away from the cellular antenna 45, as explained in greater detail below.

More particularly, a user will typically hold the upper portion of the housing 21 very close to his head so that the audio output transducer 49 is directly next to his ear. Yet, the lower portion 47 of the housing 21 where an audio input transducer (i.e., microphone) is located need not be placed directly next to a user's mouth, and can be held away from the user's mouth. That is, holding the audio input transducer close to the user's mouth may not only be uncomfortable for the user, but it may also distort the user's voice in some circumstances.

Another important benefit of placing the cellular antenna 45 adjacent the lower portion 47 of the housing 21 is that this may allow for less impact on antenna performance due to blockage by a user's hand. That is, users typically hold cellular phones toward the middle to upper portion of the phone housing, and are therefore more likely to put their hands over such an antenna than they are an antenna mounted adjacent the lower portion 47 of the housing 21. Accordingly, more reliable performance may be achieved by placing the cellular antenna 45 adjacent the lower portion 47 of the housing 21.

Still another benefit of this configuration is that it provides more room for one or more auxiliary input/output (I/O) devices 50 to be carried at the upper portion 46 of the housing. Furthermore, by separating the cellular antenna 45 from the auxiliary I/O device(s) 50, this may allow for reduced interference therebetween.

Examples of auxiliary I/O devices 50 include a WiFi or WLAN (e.g., Bluetooth, IEEE 802.11) antenna for providing WLAN communication capabilities, as will be explained in greater detail below, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

The device 20 further illustratively includes a display 22, for example, a liquid crystal display (LCD) carried by the housing 21 and connected to the circuitry 48. A back button 36 and scroll wheel 37 can also be connected to the circuitry 48 for allowing a user to navigate menus, text, etc., as will be appreciated by those skilled in the art. The scroll wheel 37 may also be referred to as a "thumb wheel" or a "track wheel" in some instances. The keypad 23 illustratively includes a plurality of multi-symbol keys 24 each having indicia of a plurality of respective symbols thereon. The keypad 23 also illustratively includes an alternate function key 25, a next key 26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "#", respectively, upon first actuating the alternate function key 25. The keypad 23 further illustratively includes a send key 31, an end key 32, and a convenience (i.e., menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 2, the multi-symbol keys 24 are arranged in the first three rows on the keypad 23 below the send and end keys 31, 32. Furthermore, the letter symbols on each of the keys 24 are arranged to define a QWERTY layout. That is, the letters on the keypad 23 are presented in a three-row format, with the letters of each row being in the same order and relative position as in a standard QWERTY keypad.

Each row of keys (including the fourth row of function keys 25-29) is arranged in five columns. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and "#" upon first actuating the alternate function key 25, as noted above, this set of keys defines a standard telephone keypad layout, as would be found on a traditional touch-tone telephone, as will be appreciated by those skilled in the art.

Accordingly, the mobile wireless communications device 20 as described may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

The cellular antenna 45 is preferably formed as a multi-frequency band antenna, which provides enhanced transmission and reception characteristics over multiple operating frequencies. More particularly, the cellular antenna 45 is designed to provide high gain, desired impedance matching, and meet applicable SAR requirements over a relatively wide bandwidth and multiple cellular frequency bands. By way of example, the cellular antenna 45 preferably operates over five bands, namely a 850 MHz Global System for Mobile Communications (GSM) band (GSM 850), a 900 MHz GSM band, a DCS band, a PCS band, and a WCDMA band (i.e., up to about 2100 MHz) (or COMA 850/1900), although it may be used for other bands/frequencies as well. To conserve space, the cellular antenna 45 may advantageously be implemented in three dimensions although it may be implemented in two-dimensional or planar embodiments as well.

The mobile wireless communications device shown in FIGS. 1 and 2 can incorporate e-mail and messaging accounts and provide different functions such as composing e-mail, PIN messages, and SMS messages. The device can manage messages through an appropriate menu that can be retrieved by choosing a messages icon. An address book function could add contacts, allow management of an address book, set address book options and manage SIM card phone books. A phone menu could allow for the making and answering of phone calls using different phone features, managing phone call logs, setting phone options, and viewing phone information. A browser application could permit the browsing of web pages, configuring a browser, adding bookmarks, and changing browser options. Other applications could include a task, memo pad, calculator, alarm and games, as well as handheld options with various references.

A calendar icon can be chosen for entering a calendar program that can be used for establishing and managing events such as meetings or appointments. The calendar program could be any type of messaging or appointment/meeting program that allows an organizer to establish an event, for example, an appointment or meeting.

A non-limiting example of various functional components that can be used in the exemplary mobile wireless communications device 20 of FIGS. 1 and 2 is further described in the example below with reference to FIG. 3. The device 20 illustratively includes a housing 120, a keypad 140 and an output device 160. The output device 160 shown is preferably a display, which is preferably a full graphic LCD. Other types of output devices may alternatively be used. A processing device 180 is contained within the housing 120 and is coupled between the keypad 140 and the display 160. The processing device 180 controls the operation of the display 160, as well as the overall operation of the mobile device 20, in response to actuation of keys on the keypad 140 by the user.

The housing 120 may be elongated vertically, or may take on other sizes and shapes (including clamshell housing structures). The keypad may include a mode selection key, or other hardware or software for switching between text entry and telephony entry.

In addition to the processing device 180, other parts of the mobile device 20 are shown schematically in FIG. 3. These include a communications subsystem 101; a short-range communications subsystem 102; the keypad 140 and the display 160, along with other input/output devices 106, 108, 110 and 112; as well as memory devices 116, 118 and various other device subsystems 121. The mobile device 20 is preferably a two-way RF communications device having voice and data communications capabilities. In addition, the mobile device 20 preferably has the capability to communicate with other computer systems via the Internet.

Operating system software executed by the processing device 180 is preferably stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130A-130N on the device 20. A predetermined set of applications that control basic device operations, such as data and voice communications 130A and 130B, may be installed on the device 20 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 141. Preferably, the PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161. The specific design and implementation of the communications subsystem 101 is dependent upon the communications network in which the mobile device 20 is intended to operate. For example, the mobile device 20 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, COMA, PCS, GSM, etc. Other types of data and voice networks, both separate and integrated, may also be utilized with the mobile device 20.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 20 may send and receive communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the keypad 140 and/or some other auxiliary I/O device 106, such as a touchpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 20. In addition, the display 160 may also be utilized in voice communications mode, for example to display the identity of a calling party, the duration of a voice call, or other voice call related information.

Any short-range communications subsystem enables communication between the mobile device 20 and other proximate systems or devices, which need not necessarily be similar devices. For example, the short-range communications subsystem may include an infrared device and associated circuits and components, or a Bluetooth™ communications module to provide for communication with similarly-enabled systems and devices.

It should be understood that GSM is one type of preferred communications system and uses a radio interface that can have an uplink frequency band and downlink frequency band with about 25 MHz bandwidth, typically subdivided into 124 carrier frequency channels, each spaced about 200 KHz apart as non-limiting examples. Time division multiplexing can be used to allow about 8 speech channels per radio frequency channel, giving 8 radio time slots and 8 burst periods grouped into what is called a TDMA frame. For example, a channel data rate could be about 270.833 Kbps and a frame duration of about 4.615 milliseconds (MS) in one non-limiting example. The power output can vary from about 1 to about 2 watts.

Linear predictive coding (LPC) can also be used to reduce the bit rate and provide parameters for a filter to mimic a vocal track with speech encoded at about 13 Kbps. Four different cell sizes can be used in a GSM network, including macro, micro, pico and umbrella cells. A base station antenna can be installed on a master building above the average rooftop level in a macrocell. In a microcell, the antenna height can be under the average rooftop level and used in urban areas. Microcells typically have a diameter of about a few dozen meters and are used indoors. Umbrella cells can cover shadowed regions or smaller cells. Typically, the longest distance for the GSM specification covered by an antenna is about 22 miles depending on antenna height, gain and propagation conditions.

GSM systems typically include a base station subsystem, a network and switching subsystem, and a General Packet Radio Service (GPRS) core network. A subscriber identify module (SIM) is usually implemented in the communications device, for example, the well known SIM card, similar to a smart card containing the subscription information and phone book of a user. The user can also switch handsets or could change operators by changing a SIM.

The GSM signaling protocol has three general layers. Layer 1 is a physical layer using channel structures above the air interface. Layer 2 is the data link layer. Layer 3 is a signaling protocol, which includes three sublayers. These include a Radio Resources Management sublayer to control the setup, maintenance and termination of radio and fixed channels, including handovers. A Mobility Management sublayer manages the location updating and registration procedures and secures the authentication. A Connection Management sublayer handles general call control and manages supplementary services and the short message service, Signaling between different entities such as the Home Location Register (HLR) and Visiting Location Register (VLR) can be accomplished through a Mobile Application Part (MAP) built upon the Transaction Capabilities Application Part (TCAP) of the top layer of the Signaling System No. 7.

A Radio Resources Management (RRM) sublayer can oversee the radio and fixed link establishment between the mobile station and an MSE.

It is also possible to used Enhanced Data Rates for GSM Evolution (EDGE), as an enhancement to General Packet Radio Service (CPRS) networks. EDGE can use 8 Phase Shift Keying (8 PSK) and Gaussian Minimum Shift Keying (GMSK) for different modulation and coding schemes. A three-bit word can be produced for every changing carrier phase. A rate adaptation algorithm can adapt the Modulation and Coding Scheme (MCS) according to the quality of the radio channel and the bit rate and robustness of data transmission. Base stations are typically modified for EDGE use.

Figure 4:
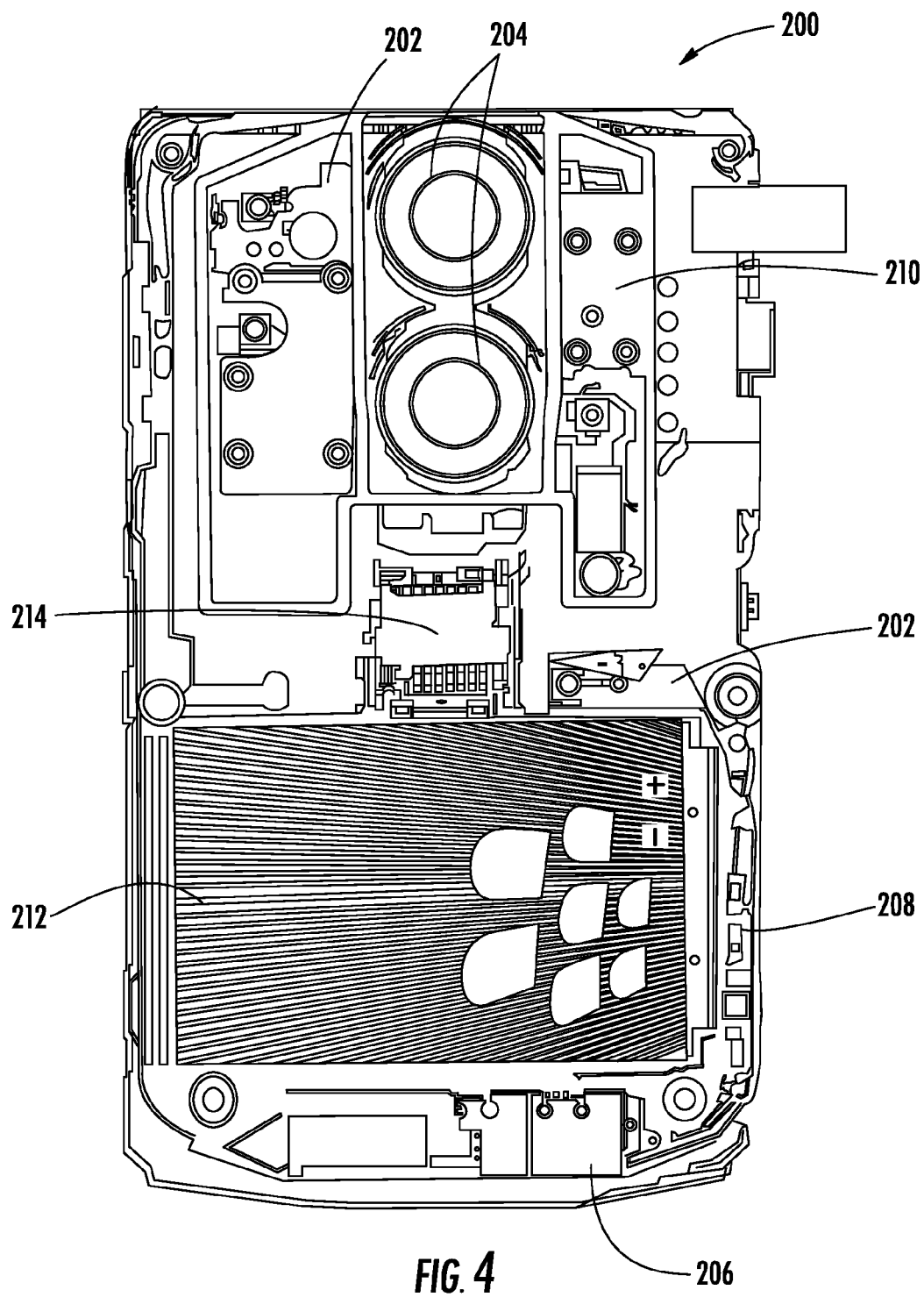
FIG. 4 is a plan view showing the interior of a mobile wireless communications device similar to those shown in FIGS. 1 through 3 and showing in greater detail the relative positioning of a WiFi antenna and a cellular (or GSM) antenna.

FIG. 4 is a top plan view showing the interior of a mobile wireless communications device 200, such as described in FIGS. 1-3, but that incorporates the first and second antenna designs described above. Reference numerals begin in the 200 series for the description relative to FIGS. 4-6. The device 200 shown in FIG. 4 includes a printed circuit board 202 and various transducers 204 having a function as described before. The main cellular antenna 206 is illustrated at the bottom portion of the housing 208 and corresponds to the antenna described before, and operative as a multi-frequency antenna as described before. The WiFi antenna 210 is positioned at the upper right corner inside the housing in this non-limiting example and shown as a rectangular configured antenna. It is operative at the 2.4 GHz frequency band in accordance with a non-limiting example for WiFi, WLAN and similar applications. It could be used for other applications in some non-limiting examples. A battery 212 and other electronic components 214 are shown positioned on the circuit board 202 as illustrated. This antenna 210 has its feeding point 210a at the bottom edge or formed "leg" 210b and toward the cellular antenna 206 as illustrated.

Figure 5:
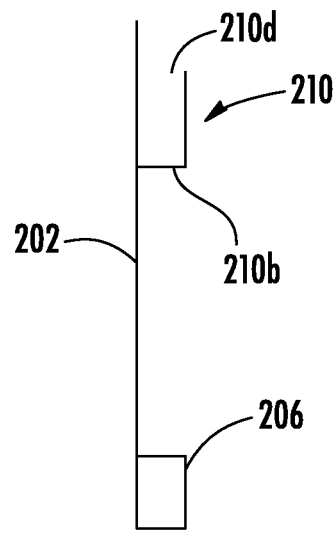
FIG. 5 is a fragmentary, side elevation view of the communications device such as shown in FIG. 4 and showing a fragmentary representation of the circuit board and the configuration of a bottom-fed WiFi antenna formed as an inverted-F antenna, and showing an opening gap facing up and its position relative to the cellular antenna, in accordance with a non-limiting example.

FIG. 5 is a fragmentary, side-elevation view showing the printed circuit board 202 that is operative as a ground plane. The WiFi antenna 210 is preferably formed as an inverted-F antenna and is bottom fed. This WiFi antenna 210 is positioned away from the cellular antenna 206 formed as a GSM antenna (or COMA) in this non-limiting example. The cellular antenna 206 is positioned at the lower portion of the device housing, and can be configured as described before. The WiFi antenna 210 is positioned toward the upper portion of the housing and is bottom fed, such that the lower horizontal leg 210b that forms part of the inverted-F is positioned towards the cellular antenna 206.

Figure 6:
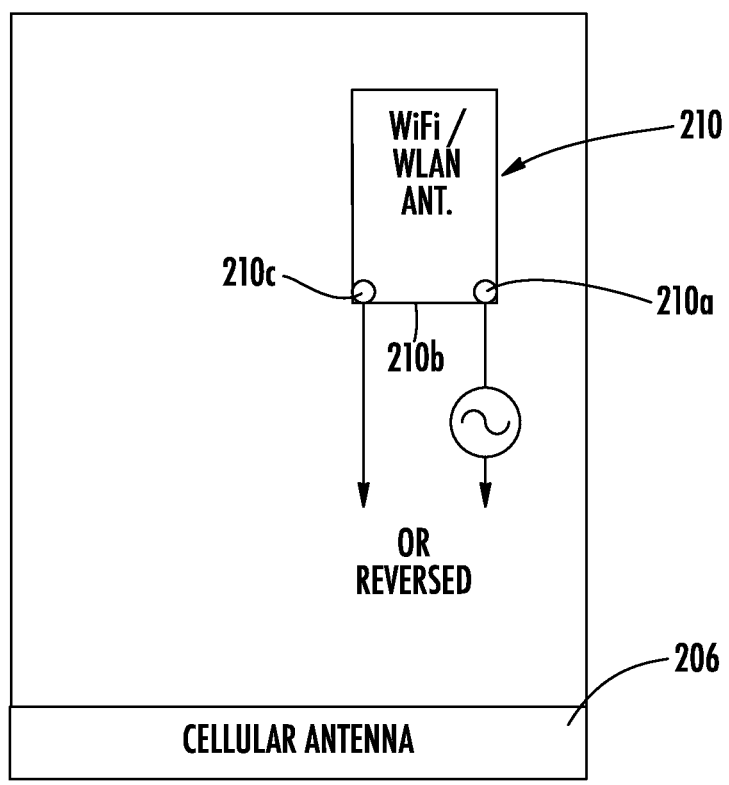
FIG. 6 is a fragmentary, top plan view of the circuit board shown in FIG. 5, and showing the location of the cellular antenna, the location of WiFi antenna formed as an inverted-F antenna, and location of the grounding and feeding points at opposite, lower corners of the inverted-F antenna, in accordance with a non-limiting example.

FIG. 6 is a plan view showing the feeding point 210a and a grounding point 210c positioned at lower corners on the "leg" 210b relative to the cellular antenna 206, as illustrated. The opening gap 210d formed by the inverted-F or monopole design is positioned opposite from the cellular antenna 206, towards the top or upper portion of the device as illustrated.

It should be understood that the design of the inverted-F or monopole antenna 210 can vary depending on end-use requirements and the nature of the housing, circuit board, proximity to the main cellular antenna, and other factors that could be determined by those skilled in the art. Typically, the height of the inverted-F is established by the leg 210b relative to the ground plane defined by the PCB 202. Input impedance at the feeding point 210a can vary from about 30 to about 75 ohms, but centered at 50 ohms, in some non-limiting examples. Resonances can vary depending on the type of feeding lines or traces that are used.

The inverted-F antenna typically is a small size and is designed for ease of design and fabrication. This WiFI antenna 210 as described could be fed by a microstrip line printed on the printed circuit board 202. In some cases, the inverted-F antenna could be formed as an Active Inverted-F Antenna (AIFA) and printed on the PCB 202, for example, with a thickness of about 1 mm in one non-limiting example. Some designs could use a straight-F design and still be printed on a FR-4 or similar substrate with other circuit components to provide a low-cost antenna. For example, in a straight-F antenna, an inductive tuning arm could be on the same side of a capacitive arm. In any event, the antenna designs should be designed such that the opening gap 210d is positioned to face away from the cellular antenna 206, in these non-limiting examples.

In some non-limiting examples, an inverted-F antenna is similar to a free-standing (quarter-wave) monopole positioned above a ground plane, rather than a half-wave printed antenna in some non-limiting examples. The antenna can be formed in an area less than about 10 mm by 10 mm in non-limiting examples. The inductive and capacitive arms of an inverted-F antenna could add to the total antenna length in some designs. In other antenna designs, it is possible to have a ground plane edge to determine functional characteristics and the operation band. An upper part of the "F" could be used for inductive tuning and a lower part of the "F" could be used to form a capacitively coupled monopole.

It is possible to apply Method of Moments (MoM) design considerations to wire antennas of arbitrary shape to form a Dual Inverted-F Antenna (DIFA). It should be understood that the inverted-F antenna is a variation on a transmission line antenna or bent monopole antenna. It could include an offset feed to provide for adjustment of the input impedance in some non-limiting examples. Thus, the resulting antenna geometry resembles the letter F, rotated to face the ground plane.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
a housing;
circuitry within said housing;
a first antenna within said housing and coupled to said circuitry for cellular communications in at least one first frequency band; and
a second antenna within said housing and coupled to said circuitry for communications in at least one second frequency band;
wherein said second antenna comprises a monopole antenna defining an opening gap pointed in a direction within said housing away from said first antenna, and
wherein said at least one second frequency band is harmonically related to said at least one first frequency band.

2. The mobile wireless communications device according to claim 1, wherein said second antenna is bottom-fed relative to said first antenna.

3. The mobile wireless communications device according to claim 2 further comprising a circuit board within said housing; and wherein at least one of said first and second antennas is supported by said circuit board.

4. The mobile wireless communications device according to claim 3, wherein said circuit board is coupled to an antenna ground plane.

5. The mobile wireless communications device according to claim 1 wherein said housing comprises first and second opposing housing portions; and wherein said first antenna is supported within the first housing portion, and said second antenna is supported within the second housing portion.

6. The mobile wireless communications device according to claim 5 wherein the first housing portion comprises a lower housing portion, and the second housing portion comprises an upper housing portion.

7. The mobile wireless communications device according to claim 1 wherein said housing comprises at least one of a static housing, a flip housing, and a sliding housing.

8. The mobile wireless communications device according to claim 1 wherein the at least one first frequency band comprises at least one Global System for Mobile (GSM) communications frequency band.

9. The mobile wireless communications device according to claim 1 wherein the at least one second frequency band comprises at least one 802.11 standards frequency band.

10. The mobile wireless communications device according to claim 1 wherein the opening gap is directed towards an adjacent end of said housing.

11. A mobile wireless communications device comprising:
a housing;
circuitry within said housing;
a first antenna extending in a first direction within said housing and coupled to said circuitry for cellular communications in at least one first frequency band; and
a second antenna coupled to said circuitry for communications in at least one second frequency band,
wherein said second antenna comprises a monopole antenna defining an opening gap pointed in a second direction within said housing transverse to the first direction and away from said first antenna;
wherein said at least one second frequency band is harmonically related to said at least one first frequency band.

12. The mobile wireless communications device according to claim 11, wherein said second antenna is bottom-fed relative to said first antenna.

13. The mobile wireless communications device according to claim 11, wherein the at least one first frequency band comprises at least one Global System for Mobile (GSM) communications frequency band.

14. The mobile wireless communications device according to claim 11 wherein the at least one second frequency band comprises at least one 802.11 standards frequency band.

15. The mobile wireless communications device according to claim 11 further comprising a circuit board within said housing; and wherein at least one of said first and second antennas is supported by said circuit board.

16. The mobile wireless communications device according to claim 15 wherein said circuit board is coupled to an antenna ground plane.

17. The mobile wireless communications device according to claim 11 wherein said housing comprises first and second opposing housing portions; and wherein said first antenna is supported within the first housing portion, and said second antenna is supported within the second housing portion, and wherein said housing comprises at least one of a static housing, a flip housing, and a sliding housing.

18. The mobile wireless communications device according to claim 17 wherein the first housing portion comprises a lower housing portion, and the second housing portion comprises an upper housing portion, and wherein the opening gap is directed towards an adjacent end of said housing.

19. A method of making a mobile wireless communications device comprising:
providing a housing with circuitry therein;
forming a first antenna extending within the housing and coupled to the circuitry for cellular communications in at least one first frequency band; and
forming a second antenna coupled to the circuitry for communications in at least one second frequency band, the second antenna comprising a monopole antenna defining an opening gap pointed within the housing away from the first antenna, wherein said at least one second frequency band is harmonically related to said at least one first frequency band.

20. The method according to claim 19 wherein said second antenna is bottom-fed relative to said first antenna and further comprising positioning a circuit board within the housing; and wherein at least one of the first and second antennas is supported by the circuit board.

21. The method according to claim 20 wherein the circuit board is coupled to an antenna ground plane.

22. The method according to claim 19 further comprising positioning first and second circuit boards within the housing; and wherein the first antenna is supported by the first circuit board, and the second antenna is supported by the second circuit board.

23. The method according to claim 19 wherein the housing comprises first and second opposing housing portions; and wherein the first antenna is supported within the first housing portion, and the second antenna is supported within the second housing portion.

24. The method according to claim 23 wherein the first housing portion comprises a lower housing portion, and the second housing portion comprises an upper housing portion.

25. The method according to claim 19 wherein the housing comprises at least one of a static housing, a flip housing, and a sliding housing.

26. The method according to claim 19 wherein the at least one first frequency band comprises at least one Global System for Mobile (GSM) communications frequency band.

27. The method according to claim 19 wherein the at least one second frequency band comprises at least one 802.11 standards frequency band.

28. The method according to claim 19 wherein the opening gap is directed towards an adjacent end of the housing.

* * * * *